United States Patent [19]

Whalen

[11] Patent Number: 4,545,204
[45] Date of Patent: Oct. 8, 1985

[54] INFINITELY VARIABLE TANDEM TRANSMISSION

[76] Inventor: Brian L. Whalen, 365 Furrows Rd., Holbrook, N.Y. 11741

[21] Appl. No.: 544,711

[22] Filed: Oct. 24, 1983

[51] Int. Cl.$^4$ ............................................. F16D 39/00
[52] U.S. Cl. ........................................ 60/491; 418/28
[58] Field of Search ..................... 60/491, 490; 418/28

[56] References Cited

U.S. PATENT DOCUMENTS

| | | | |
|---|---|---|---|
| 1,365,553 | 1/1921 | Sheriff | 60/491 |
| 1,527,685 | 2/1925 | Huwiler | 418/28 |
| 2,155,455 | 4/1939 | Thoma | 92/127 X |
| 2,398,313 | 4/1946 | Jensen | 418/28 X |
| 2,535,267 | 12/1950 | Cline | 60/491 X |
| 2,581,160 | 1/1952 | Adams et al. | 418/28 X |
| 2,840,991 | 7/1958 | Nisbet | 418/28 X |
| 2,927,430 | 3/1960 | Castles, Jr. | 60/491 |

Primary Examiner—Edward K. Look
Attorney, Agent, or Firm—Leonard Belkin

[57] ABSTRACT

A hydraulic transmission with infinitely variability comprising a pair of identical cages in mirror image configuration containing radial slots, radial and axial vanes within the slots and camming surfaces to reciprocate the radial and axial vanes over the rotation of the cages, a non-rotatable but axially slidable cylinder for forming chambers within the slots of the cages, one of the cages being the pump and the other the hydraulic motor, and provision to slide the cylinder to adjust differentially the volumes within the chambers and therefore the input to output torque speed ratios of the transmission.

9 Claims, 17 Drawing Figures

INFINITELY VARIABLE TANDEM TRANSMISSION

BACKGROUND OF THE INVENTION

The present invention relates to a hydraulic transmission and more particularly to a hydraulic transmission, which is infinitely differential and hydrodynamically stable.

Transmissions for automotive vehicles and certain other types of machinery require a high output torque at low rotational speeds where there may be a decline in torque requirement as output speed increases and engine load decreases. The purpose of such transmissions is to make the adjustments of speed and torque inputs and outputs to meet the load requirements. The hydraulic transmission makes these adjustments in a manner which is generally smoother than is possible in transmissions which employ clutches and mechanical shifting arrangements.

While many hydraulic transmissions in general use do make torque and speed adjustments at finite points in the range of operation of the engine and the vehicle, there are hydraulic transmissions which have the capability of producing continuously variable changes in these ratios. That is, the relationship of torque and speed input to the transmission output of torque and speed, respectively, can be continuously adjusted over a particular range of operation.

Hydraulic transmissions which are currently available and have that capability generally suffer from a variety of disadvantages. Most such systems have internal eccentric arrangements, typically with all high pressure fluid on one side and all low pressure fluid on another side with the result that there is enormous side loading on the shaft and casing, as for example in U.S. Pat. No. 2,927,430 where provision is made to bear the outward thrust of the driven rotor. In such a case, transmission construction requires the use of large and heavy components with consequent increase in cost, loss of efficiency, and greater need for space to accommodate the transmission.

In view of the long term trend to reduce the size and weight of automotive vehicles to improve fuel efficiency and stretch out available and potential supplies of hydrocarbon fuels, it is readily seen that any significant improvement in transmission design which will make it possible to reduce the size and weight of this essential component of automotive vehicles using internal combustion engines is likely to have a very beneficial effect on this form of transportation.

In addition, smaller and lighter weight transmissions will tend to reduce the cost of such vehicles and any other machinery requiring transmissions of the type herein described.

SUMMARY OF THE INVENTION

The present invention overcomes many of the problems and drawbacks of presently known variable hydraulic transmissions by providing a hydraulic transmission capable of being hydrodynamically balanced in all directions, is infinitely variable, and is compact and light in weight.

In accordance with the principles of this invention, a preferred embodiment of this invention consists of a hydraulic transmission having a stationary housing with a central axis, and a cylindrical member within the housing keyed against rotation. The cylindrical member has a central portion with an axis of rotation coinciding with the central axis, and end portions of smaller diameter having an axis of rotation offset from the central axis. There is one rotatable shaft entering the housing on one side along the central axis and a second shaft along the same axis entering the housing from the other side. A air of rotatable cages are arranged over the central and end portions of the cylindrical member and connected to the two shafts. The cages with the central axis as their axis of rotation are provided with radially extended slots in which are situated radial and axial vanes which are slidable within the slots and overlap the central and end portions of the cylindrical member. If one of the cage members is rotated by its shaft, the radial and axial vanes will form within the slots chambers with the central portion. An axial vane sliding on each end portion overlapped by the radial vane fully encloses each chamber. The chambers change in size as they rotate due to the eccentricity of camming surfaces in the housing causing radial movement of the radial vanes about the central portion of the cylinder member. When hydraulic fluid is supplied to these chambers and communication is provided between corresponding high pressure chambers and low pressure chambers, respectively, formed by both cages, it will be seen that the other cage will be driven by the hydraulic fluid under pressure and the second shaft becomes the output of the transmission. This embodiment has among many of its advantages complete balancing of forces along the axis of the transmission.

Other preferred embodiments of this invention incorporate complete balancing in all radial directions as well as in the axial direction and a pump configuration.

It is thus a principal object of this invention to provide a hydraulic transmission of compact design with improved hydrodynamic stability.

Other objects and advantages of this invention will become obvious from the following detailed description of preferred embodiments of this invention.

DESCRIPTION OF THE PREFERRED EMBODIMENTS

Figure 2:
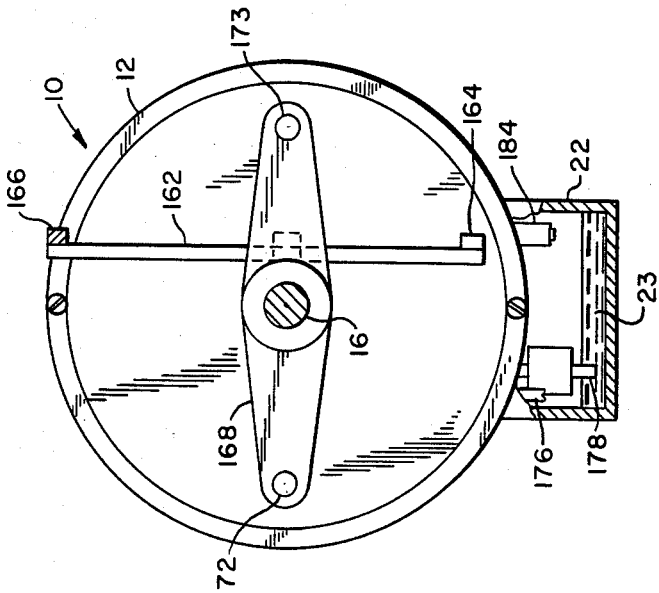
FIG. 2 is a left side view of the transmission shown in FIG. 1 with the sump partially cut away.
Figure 1:
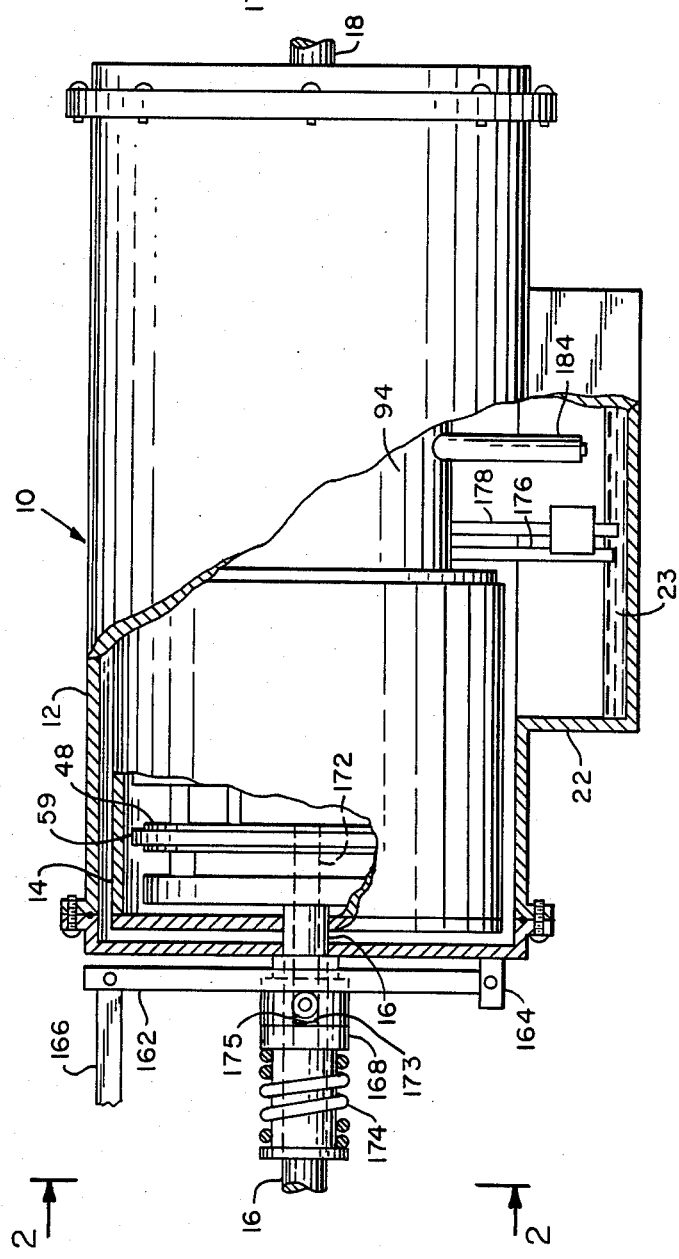
FIG. 1 is an elevation view, partially cut away, of a preferred embodiment of this invention.

Referring to FIGS. 1 and 2, hydraulic transmission 10 consists of a stationary outer housing 12, a stationary inner housing 14 spaced from housing 12, and a pair of rotatable shafts 16 and 18. Housing 12 is provided with a sump 22 containing hydraulic fluid 23. Although housing 14 is shown as a unitary structure, it is understood that in practice it would be assembled from sections bolted or otherwise attached together.

Figure 3:
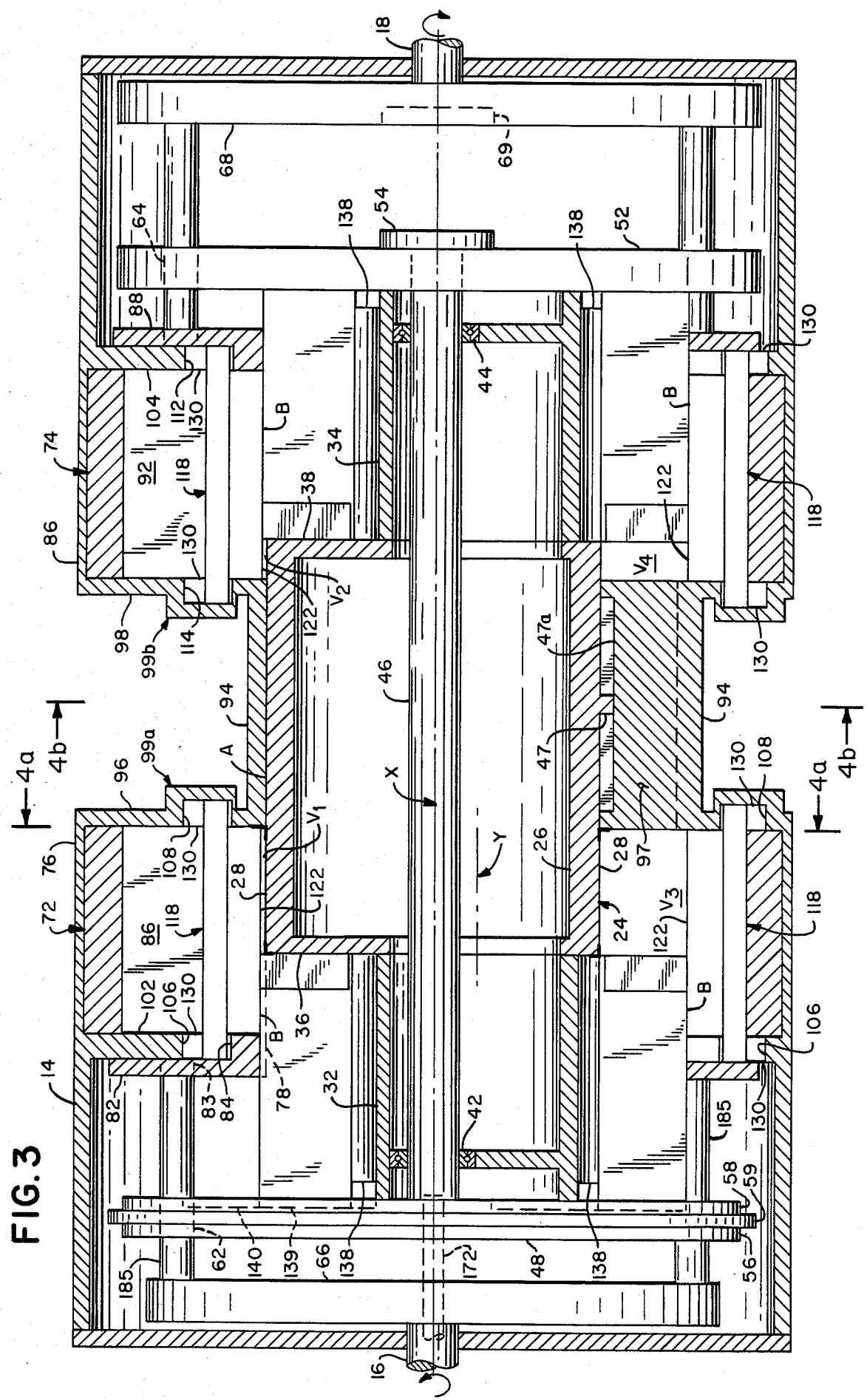
FIG. 3 is a section view of the inner housing of the transmission shown in FIG. 1.

Referring to FIG. 3, within housing 14 is a cylindrical member 24 having a central portion 26 with an outer circular surface 29 whose axis of rotation is X which is also the axis of rotatable shafts 16 and 18. Member 24 has a pair of end portions 32 and 34 circular in section, with a diameter which is less than the diameter of central portion 26, and an axis of rotation Y which is offset from axis X. A pair of shoulders 36 and 38 separate central portion 26 from end portions 32 and 34.

Cylindrical member 24 is supported by housing 14 and bearings 42 and 44 on a rotatable shaft 46. As will be seen from the description below, cylindrical member 24 is keyed against rotation by key 47 in keyway 47a but is axially slidable along with its shaft 46 which is independently rotatable.

Mounted on the ends of shaft 46 are a pair of circular thrust plates 48 and 52. Plate 48 is keyed to shaft 46 so they rotate together. Plate 52 is mounted on the other end of shaft 46 and is held on by a thrust bearing 54 but is capable of rotating at a speed independent on shaft 46. Plate 48 is provided with a pair of shoulders 56 and 58 and an extension 59 on its circumference for a purpose to be later described. Thrust plates 48 and 52 are also provided with holes 62 and 64 circumferentially arranged for a purpose to be later described. It is readily apparent that plates 48 and 52 slide axially along with cylindrical member 24 and shaft 46 on which they are mounted.

Mounted on the end of shaft 16 as it enters housing 14 is a driver plate 66. A driver plate 68 is similarly mounted on the end of shaft 18. The former has a recess 69 to accommodate thrust bearing 54 when cylindrical member 24 is moved to the right.

Figure 5:
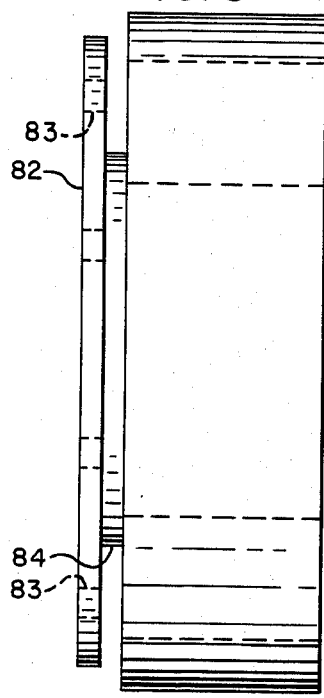
FIG. 5 is an elevation view of a cage.
Figure 6:
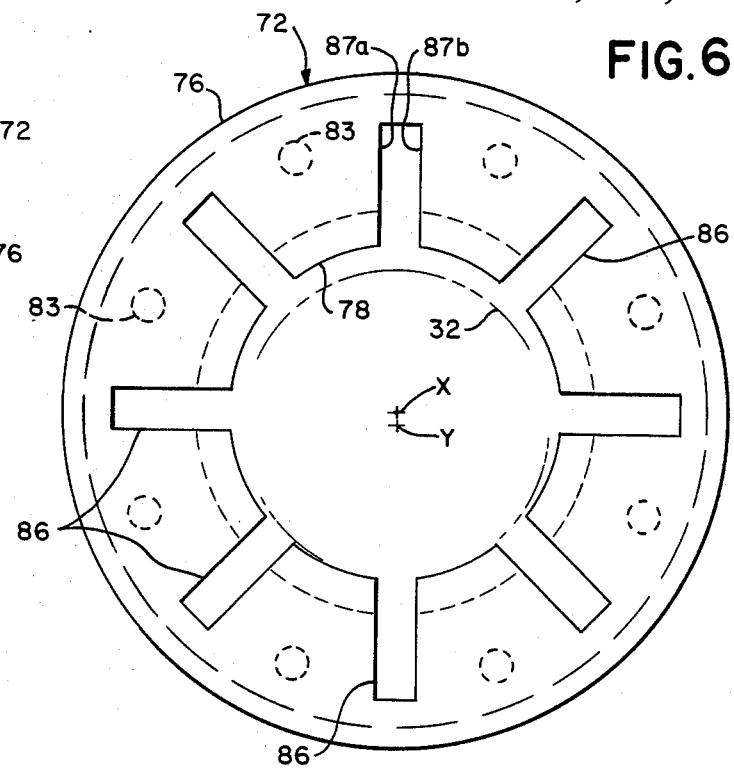
FIG. 6 is a right side view of the cage shown in FIG. 5.

A pair of identical rotatable cages 72 and 74 are mounted in mirror images of each other within housing 14. As also seen in FIGS. 5 and 6, cage 72 has a main body 76 circular on the outside with a circular opening 78 about axis X. As shown in phantom in FIG. 6 circular end portion 32 of cylindrical member 24, whose axis of rotation is Y, is eccentric with respect to circular opening 78.

Cage 72 also is provided with a flange 82 connected to main body 76 by a transition section 84. Flange 82 is provided with annularly arranged holes 83 whose purpose is to be explained later. A plurality of radially extending slots 86 with side walls 87a and 87b are formed in main body 76 for a purpose to be later described. Cage 74 as noted above is similar in construction with a main body 86, a flange 88, and radial slots 92.

Figures 4A, 4B:
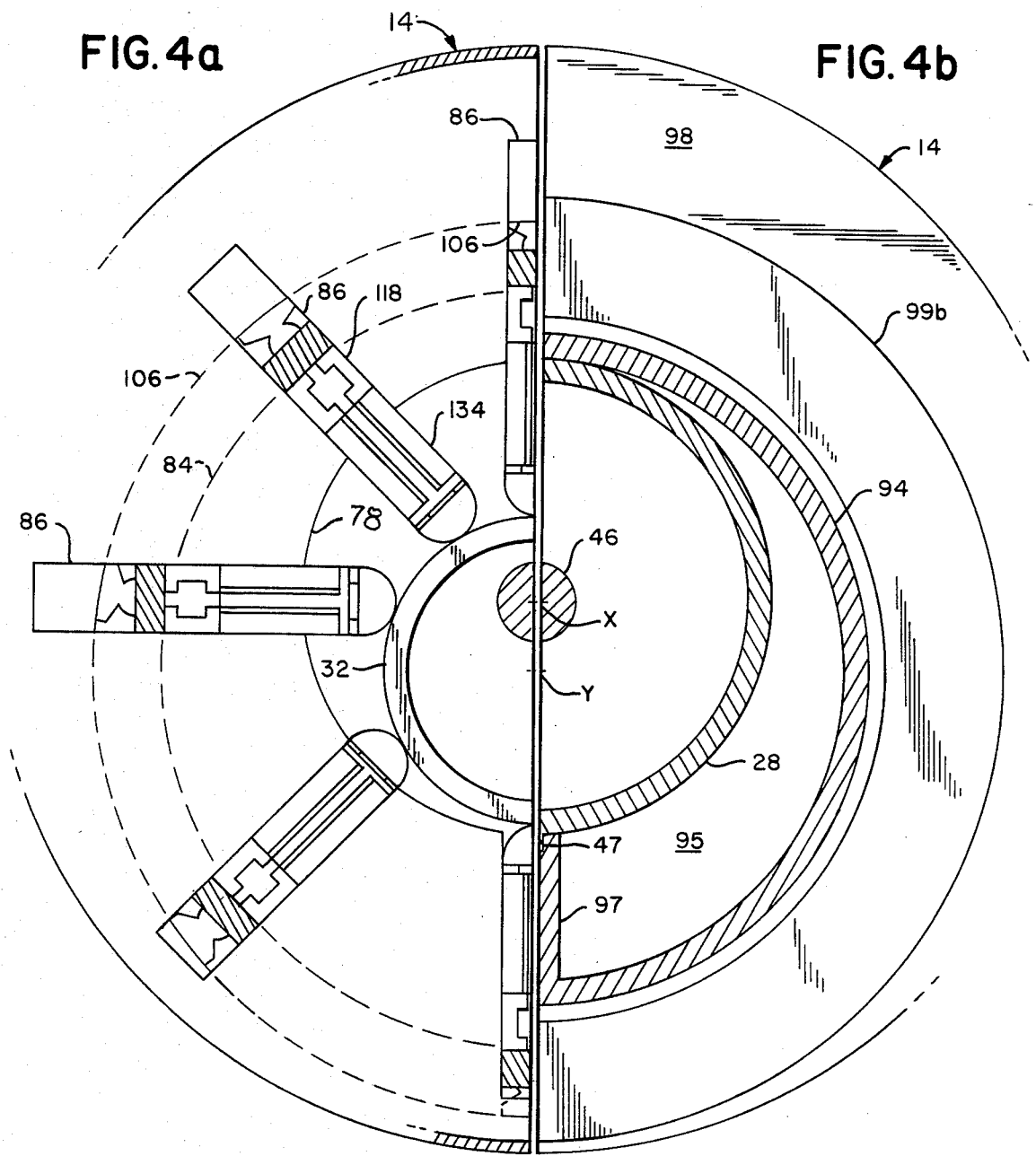
FIGS. 4a and 4b are half section views, partially schematic, along 4a—4a and 4b—4b of FIG. 3, with vanes and the cage not shown in FIG. 4b.

From FIG. 3 it will be seen that cages 72 and 74 are arranged over cylindrical member 24. Housing 14 is shaped with a wall section 94 supported by side walls 96 and 98. Wall section 94 is circular but eccentric with respect to surface 29 so that section 94 comes into contact with surface 29 along a line A and forms a cavity 95 of variable depth over the circumference of surface 28 as shown in FIG. 4b. Cavity 95 is divided into high and low pressure chambers by a wall 97 extending radially inwardly from section 94 at the maximum depth of cavity 95. It will also be noted that cages 72 and 74 overlap the central portion 26 and their respective end portions 32 and 34 of member 24. Housing 14 has interior walls 102 and 104 which extend into the spaces between the respective flanges 82, 88 and main bodies of cages 72 and 74 thereby preventing axial movement of the cages. Side walls 96, 98 and interior walls 102, 104 perform another function. These walls form circular camming surfaces 106 and 108 on one side and similar surfaces 112 and 114 on the other side whose axis of rotation is axis Y; thus, they are concentric with their end portions 32 and 34 and eccentric with respect to the central portion 26 of member 24 for a purpose which will later become obvious. Numerals 99a and 99b designate the extensions on side walls 96 and 98, respectively, enclosing the previously described camming surfaces 108 and 114.

Figure 8:
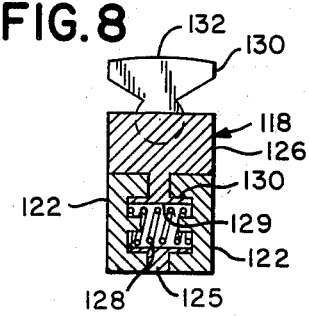
FIG. 8 is a view along 8—8 of FIG. 7.
Figure 7:
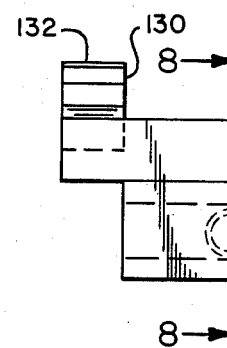
FIG. 7 is an elevation view of a radial vane.
Figure 7:
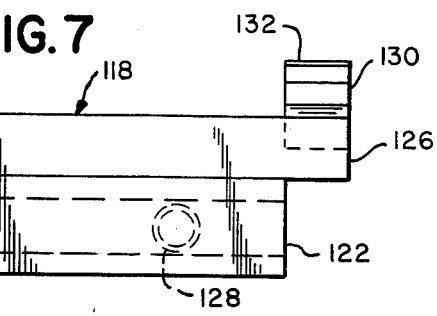

Two sets of vanes, referred to herein as radial and axial vanes, ride in the radial slots 86 and 92 of cages 72 and 74. Each radial vane 118, as illustrated more particularly in FIGS. 7 and 8, consists of a pair of pressure pads 122 slidably mounted on a post 125 extending from base 126. A pair of springs 128 fitted into holes 129 of studs 130 urge pads 122 outwardly to ride on the side walls of slots 86. Base 126 is provided with a pair of cam followers 130 at each end. Each cam follower 130 has a ball socket connection to base 126 to permit limited rotational movement and a cam surface 132 for riding on cam surfaces 106, 108 and 112, 114, respectively, previously described.

Figure 11:
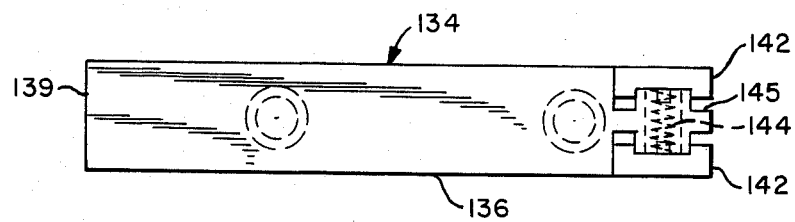
FIG. 11 is a top view of the vane shown in FIG. 9.
Figure 9:
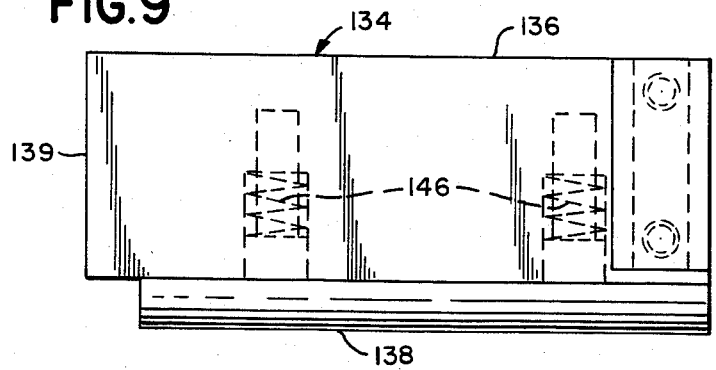
FIG. 9 is a side view of an axial vane.
Figure 10:
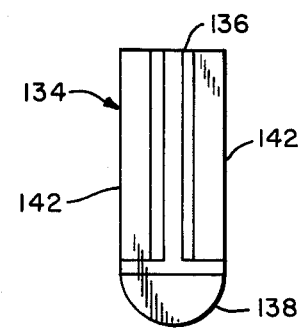
FIG. 10 is a front elevation view of the vane shown in FIG. 9.

As seen in FIGS. 9, 10 and 11, each axial vane 134 consists of a flat body 136 with a spring loaded extended element 138 to slide on the outer surface of end portion 32 or 34, and a pair of pressure pads 142 biased outwardly by springs 144 inserted in post 145 extending from body 136 similar to the construction of radial vanes 118 previously described. A pair of springs 146 similarly urge extended element 138 outwardly. Details of these biasing arrangements do not form a part of this invention. When vanes 134 are mounted, as shown in FIGS. 3 and 4, pressure pads 142 engage side walls 87a and 87b of slots 86 and extended element 138 engages the outer surfaces of end portion 32 or 34, while the side of each vane 134 opposite that of element 138 is in contact with an edge of radial vane 118 along a line B. Another edge 139 rests in an annular groove 140 in plate 48 insuring stability of the vane during rotation. A similar construction is provided in plate 52. In effect, it will be seen that within each radial slot 86 there will be formed an enclosed volume, designated V1, V2, V3, and V4 in FIG. 3, for convenience of identifying them. As cage 72, for example, rotates, due to the eccentricity of the surface on portion 32 and cam surfaces 106 and 108, with respect to surface 28, volumes V1, V2, V3, and V4 will continuously change in depth. With both cages at rest as shown in FIG. 3, corresponding slots in cages 72 and 74 will have the same depths in each volume, for example, V1 and V2 will be the same, and V3 and V4 will also be the same, as illustrated. Volumes V1 and V2 are shown at the minimum radial depths reached, and no communication between them exists because section 94 comes together with surface 28 at this line which is shown as A in FIGS. 3 and 4. Volume V3 and V4 do not communicate with each other at this point, also, because of radially extending wall 97. The thickness of wall 97 and width of contact surface at A will be slightly less than the width of slots 86 and 92. Since no dwell is provided at the top and bottom of surfaces 106, 108, 112 and 114, flow is not completely blocked at these areas but is limited to prevent significant spillover between the high and low pressure chambers. Cages 72 and 74 rotate in opposite directions and at different speeds.

During operation, when volumes V1 and V2 communicate with each other briefly as they pass each other in the opposite rotation of the cages through the high pressure chamber on one side of wall 97, then volumes V3 and V4 would communicate with each other through the low pressure chamber on the other side of wall 97.

It will be noted from FIG. 3 that even though the depths of corresponding volumes in cages 72 and 74 are the same, the volumes themselves differ due to the fact that the dimension in an axial direction of these volumes may be different and are the function of the position of cylindrical member 24 in the axial direction. For example, in FIG. 3 it is seen that the sizes of the volumes on the left side are greater than those on the right because member 24 is moved over to the left.

In order to adjust the ratio of volumes on opposite sides of walls 96 and 98, any suitable mechanical arrangement such as one employing a lever may be utilized in this embodiment to slide cylinder member 24. Referring back to FIGS. 1 and 2, on the outside of housing 2 is provided an arm 162 pivoted at 164 on one end and connected to a rod 166 at the other end. It is understood that rod 166 may be manually moved or connected to any suitable automatically operating device not forming a part of this invention. Such a device could be designed to be sensitive to selected engine operating conditions such as speed and load, and function to move automatically arm 166 to obtain a preprogrammed ratio of input to output speeds in transmission 10.

A cross member 168 at right angles to lever 162 is mounted with shaft 16 passing through it. At the extremeties of member 168 a pair of arms 172 and 173 which extend into housings 12 and 14 and engage extension 59 of thrust plate 48 so that as lever 162 is pivoted, plate 48 along with cylindrical member 24 is made to slide in the same direction as arm 166 is moved. A spring 174 may be employed for biasing and a roller 175 to engage lever 162. The arrangement for moving cylindrical member 24 can be of any suitable construction the details of which do not form a part of this invention.

Within sump 22 there is provided a low pressure return 176, a low pressure intake 178 incorporating a filter 182, and a high pressure relief valve 184.

Referring back to FIG. 3, it should be noted that either shaft 16 or 18 may be the input to transmission 10. Shaft 16 terminates in driver plate 66. The latter is provided with a plurality of annularly arranged rods 185 which pass through but are not engaged with thrust plate 48 and terminate in flange 82 of cage 72. A similar construction connects shaft 18 to cage 74. When thrust plate 48 is moved by rods 172 and 174, plate 52 along with cylinder 24 are also moved, all as a single integral unit with the result that, for example, if the assembly is moving to the left, the axial length of volume V1 and V3 is increasing while that of volumes V2 and V4 is decreasing. At the same time, shaft 16 may be rotating, in which case driver plate 66 and thrust plate 48 along with its cage 72 carrying means 118 and 134 and its keyed shaft 46 are also rotating, causing the rotation of thrust plate 52 and driver plate 68 in the opposite direction as will be seen below. Cylindrical member 24, as previously noted does not rotate.

In the operation of transmission 10 just described, shaft 16 will be considered as providing the input and is driven from an external source, such as an engine, although it is understood drive can be through shaft 18. As shaft 16 rotates, driver plate 66, rods 185, thrust plate 48, and cage 72 also rotate due to the mechanical interconnection as already described. Cylindrical member 24 does not rotate. Volume V1 on the outer surface 28 of central portion 26 of cylindrical member 24 within a single slot 86 increases in depth due to the eccentricity of cam surfaces 106 and 108, causing vane 118 within this slot to rise away from surface 28. In this case, volume V1 is a suction pocket drawing in hydraulic fluid. Referring to FIG. 3, consider the rotation of cage 72 which is rotating in such a direction that volume V1, here shown at its minimum volume, is passing from the high pressure chamber of cavity 95 to the low pressure chamber of cavity 97. As cage 72 continues to rotate, volume V3 will decrease and volume V1 will increase. As V1 increases it forms a suction pocket drawing in hydraulic fluid from the low pressure chamber. As V3 decreases, hydraulic fluid is pumped into the high pressure chamber. As a result of the hydraulic fluid being incompressible, as fluid is forced out of V3, cage 74 must rotate in the opposite direction causing volume V2 to increase. After 180 degress of rotation is reached, the maximum volumes of V3 and V4 are reached and as rotation continues the volumes begin to decrease due to the eccentricity already described. The load on shaft 18 increases the pressure of the hydraulic fluid within volumes V3 and V4 causing cage 74 to rotate under the effect of the unbalanced rotational forces produced within its slots by forcing radial vane 118 outward against camming surfaces 112 and 114. Thus, cage 72 is the hydraulic pump and cage 74 the hydraulic motor. Cage 74 drives thrust plate 52, drive plate 68, and shaft 18 which is the output of transmission 10. As already noted, communication between volumes on both ends of member 24 is by the high and low pressure parts of cavity 95.

The relative speeds of shafts 16 and 18, as well as the relative torque input and torque output, are a function of the relative volumes within the slots in cages 72 and 74. For example, when cylindrical member 24 is made to move to the left increasing the axial lengths of volumes V1 and V3 (and hence their total volumes) and decreasing that of volumes V2 and V4, torque output is reduced but the rotational speed of shaft 18 with respect to the input of shaft 16 is increased, and vice versa.

In the arrangement just described it is seen that while transmission 10 is in operation and without interrupting the flow of power as is the case in many positive shifting devices, it is possible by the movement of lever 162 to adjust continuously and in infinite degree the ratios of speed and torque. It will also be noted that because of the mirror image construction of the pump and motor parts of the device, there is complete hydrodynamic balancing of forces in the axial direction. It will also be noted that the device is compact and the drive side can be reversed at any time so that dynamic braking can be employed to a greater degree than is possible by other hydraulic transmissions. That is, braking can be increased by moving lever arm 162 to increase the load on cage 74 when it operates as a pump.

Other advantages of the arrangement just described include that the tandem configuration allows close coupling of pump and motor thereby reducing the overall size of the unit. Also, because the pumping volume is not changed by varying the eccentricity of the pumping chambers there is little spillover between the input and output sides of the pump chamber. Furthermore, because of the inherent balancing of hydrodynamic forces along the axis of the unit, changing of the volumes as described above requires only small forces and no high pressure controls are needed to hold the volumes at the desired position.

With a slight modification of the embodiment just described it is possible to obtain hydrodynamic balancing as well at right angles to the axis of the unit, in other words, eliminating side loading. This can be accomplished by giving an elliptical shape to the pump chamber and the camming surfaces which engage the vanes so that four communicating chambers alternating in high and low pressure are formed instead of two. Such a configuration is illustrated in FIGS. 12a and 12b.

Figures 12A, 12B:
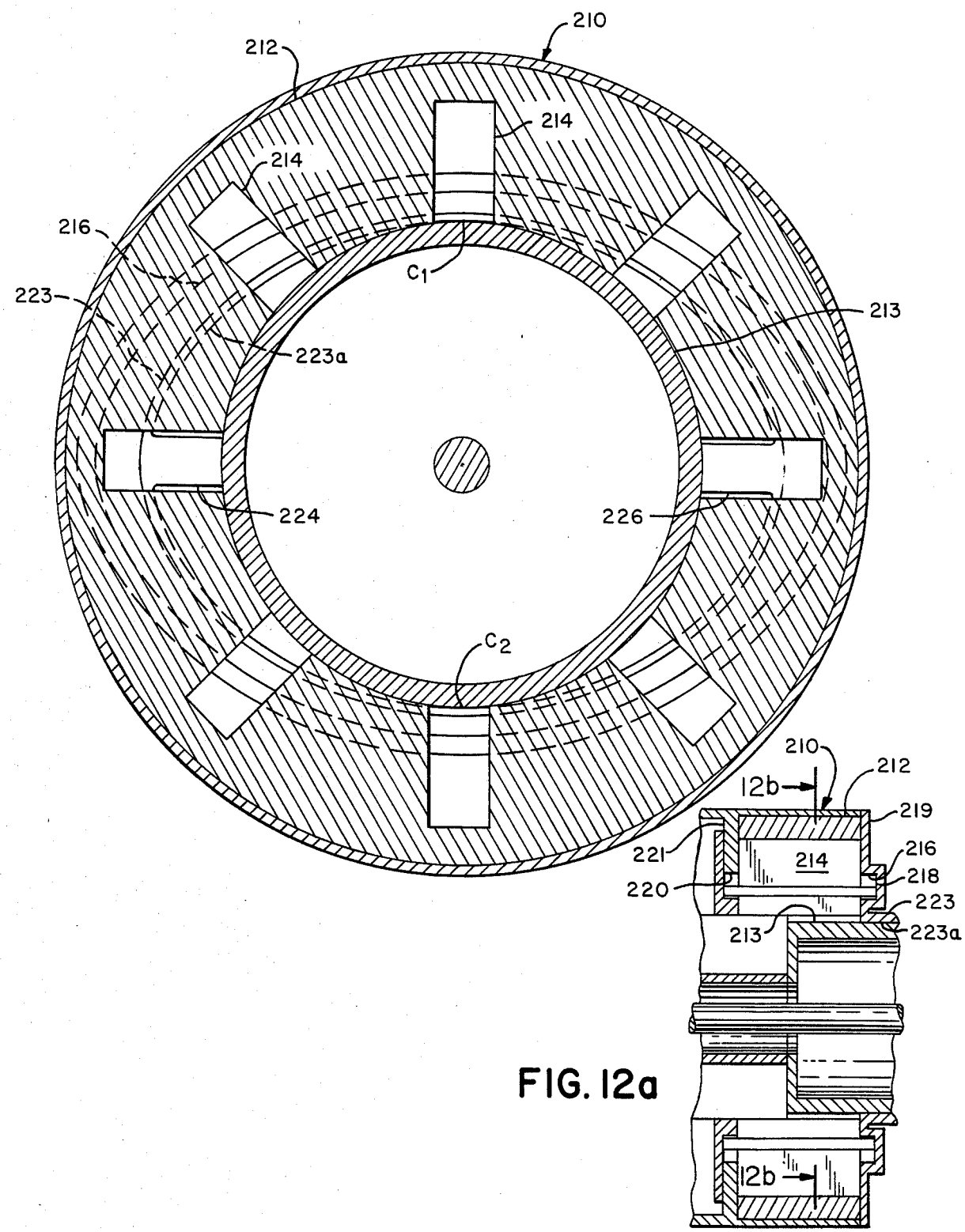
FIG. 12a is a partial view similar to FIG. 3 showing an alternative embodiment.
FIG. 12b is a section view, partially schematic, along 12b—12b of FIG. 12a with the vanes removed.

Referring to FIGS. 12a and 12b, there is shown housing 210 corresponding to housing 14 in FIG. 3 and cage 212 similar to cage 72, mounted on portion 213 corresponding to central portion 26. Cage 212 is provided with slots 214. An elliptical cam surface 216 is formed in an elliptical slot 218 in side wall 219 replacing circular cam surface 108 illustrated in FIG. 3. Vanes 118 are supported by cam surface 216 and elliptical cam surfaces 220 in wall 221.

It will be recalled that with respect to cavity 95 described in connection with FIGS. 3 and 4, there is a single radially extending wall 97 dividing that space into a pair of high and low pressure chambers. In the embodiment illustrated in FIGS. 12a and 12b, wall section 223 corresponding to wall section 94 is elliptical so that there is formed between inner surfaces 223a of section 223 and central portion 213 four chambers by radially extending walls 224 and 226 and the two regions C1 and C2 of contact between inner surface 223a and central portion 213 forming alternating high and low pressure chambers. Thus on any particular diameter drawn through central portion 213, there are either high or low pressure chambers facing each other, with the result that side forces are canceled out. The remaining construction for the embodiment shown in FIGS. 12a and 12b is identical to that of FIG. 3.

Figure 14:
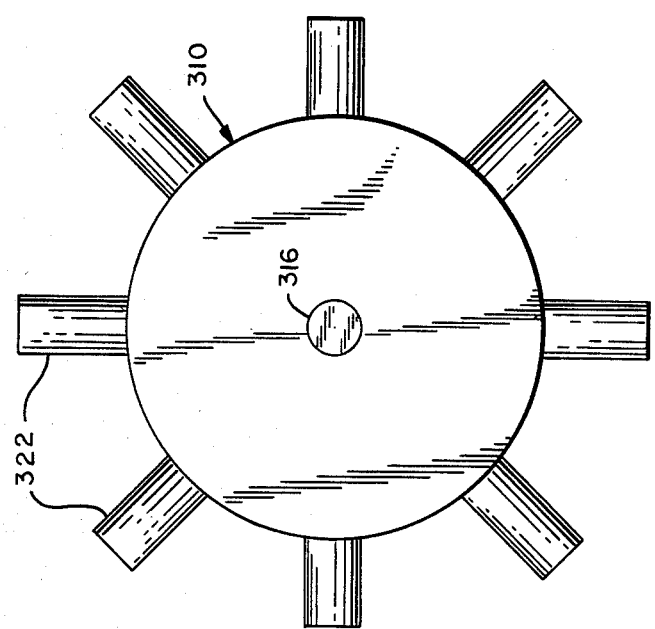
FIGS. 13 and 14, partially schematic, show elevation in partial section and a right side view, respectively, of another alternative embodiment of this invention.
Figure 13:
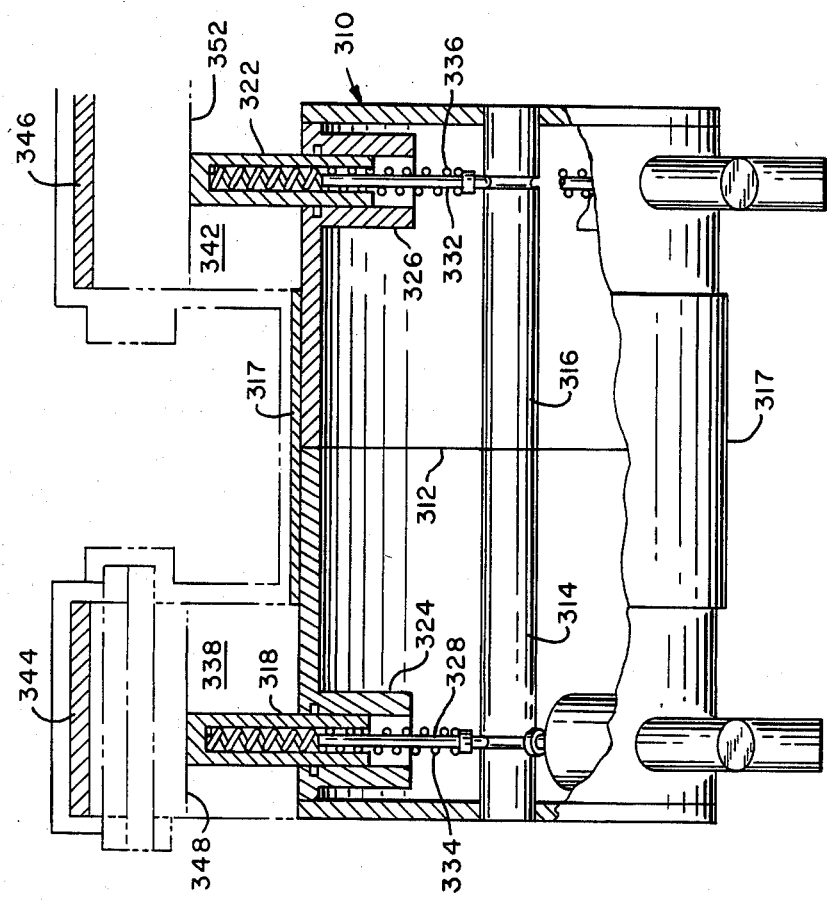

Under low load conditions, where fluid pressures are likely to be small, a transmission embodying the principles of this invention may be employed by substituting pistons for vanes shown in the other embodiments. Referring to FIGS. 13 and 14 for such an arrangement, there is illustrated a slidable, cylindrical member 310 to take the place of slidable member 24 shown in FIG. 3. Member 310 is divided at 312 and supported on two shafts 314 and 316 so that the left and right sides can rotate independently of each other. A sleeve 317 keyed to the housing keeps the left and right sides of member 310 in place. In this embodiment it will be seen that pistons 318 and 322 replace axial vanes 134. Pistons 318 and 322 ride in radial extending sleeves 324 and 326 on rods 328 and 332 and are biased outwardly by springs 334 and 336. Pistons 318 and 322 ride in the slots 338 and 342 of cages 344 and 346 which are similar to cages 72 and 74 shown in FIG. 3. Thus it is seen that member 310 in this embodiment does rotate as well as slide axially so that the pistons will stay in the slots of the cages. Pistons 318 and 322 ride on radial vanes 348 and 352 as shown. The widths of the enclosed volumes within slots 338 and 342 change in accordance with the slidable movement of member 310, while axial position of pistons 318 and 322, and vanes 348 and 352 define the depth of the chambers formed within the slots as in the arrangement shown in FIG. 3.

The embodiment of FIGS. 13 and 14 functions in the same manner as the embodiment described in connection with FIGS. 1-11, except that where load conditions are such as to require lower hydraulic pressures, pistons can be used instead of the axial vanes.

Figure 15:
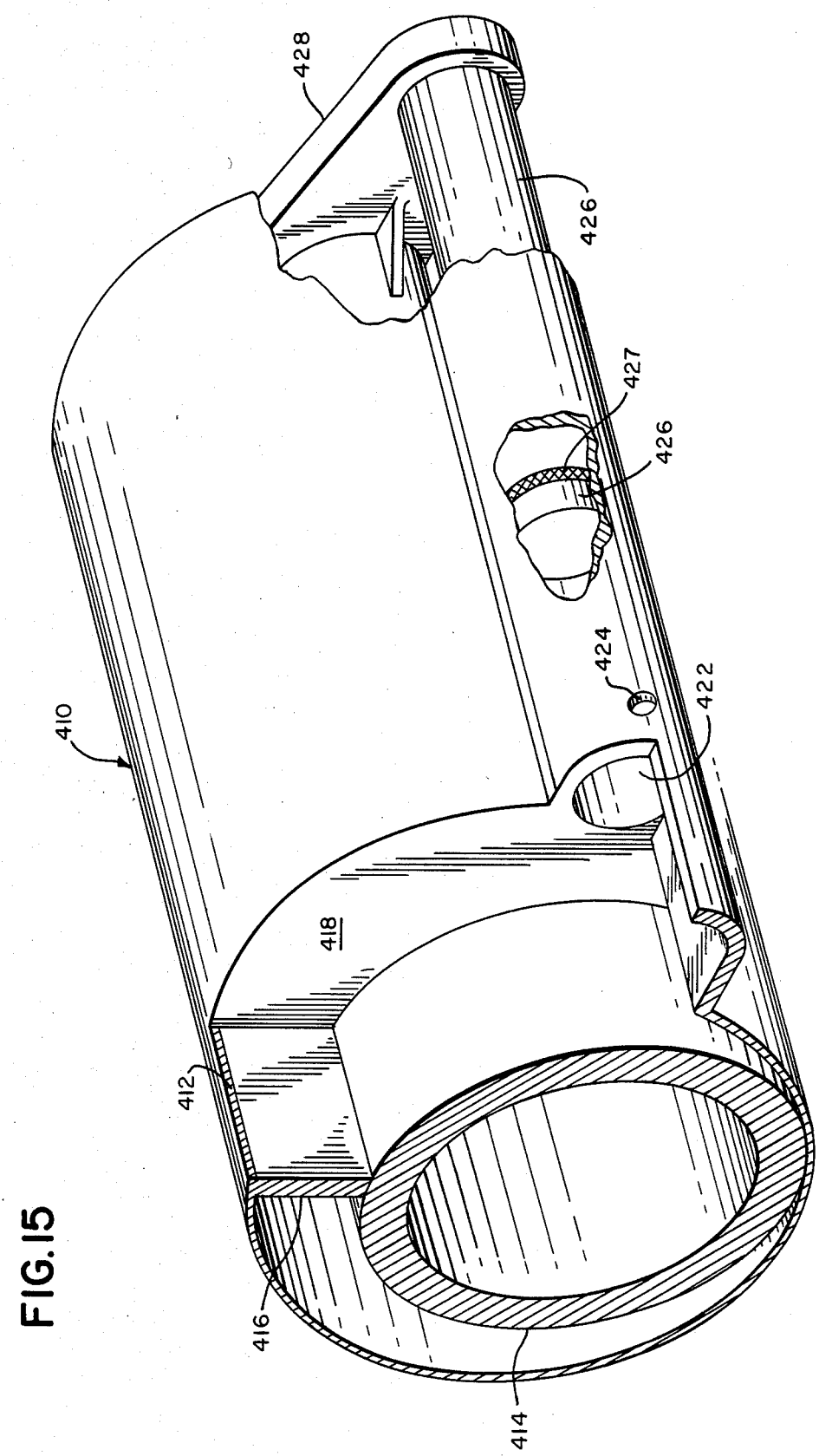
FIG. 15 is an isometric view partially cut away of another alternative embodiment of this invention.

Under some conditions it might be desirable to provide as the output of the transmissions high pressure hydraulic fluid, as where the motor is remotely located. Such an arrangement, involving basically only one side of the construction described in connection with the embodiments shown in FIGS. 1-11 and FIGS. 12 and 13, is illustrated in FIG. 15. There is shown a portion of housing 410 with a wall section 412 corresponding to wall section 94 shown in FIGS. 3 and 4 eccentric with respect to section 414 corresponding to portion 26, and a radially extending wall 416 dividing the cavity between the two into high and low pressure chambers. The left side of housing 410 which is not illustrated in this figure is identical to the left side of housing 14 in FIG. 3 and would include the cage, slots, radial and axial vanes, etc. However, instead of the pressure chambers communicating with slots in a cage on the right side, there is provided a wall 418 closing off the ends of the high and low pressure chambers formed in the cavity on both sides of wall 416 and a cylindrical cavity 422 communicating with the high pressure chamber to permit the hydraulic fluid to pass through an opening 424 to be conveyed by tubing (not shown) and employed where desired. In order to balance axially the fluid pressure, a piston 426 with packing 527 within cavity 422 having a cross section area equal to that of the time average facing areas of the axial vanes is linked by an arm 428 to slidable cylindrical member 414. Thus, regardless of the pressures developed, the device of FIG. 15 will always be hydrodynamically balanced in the axial direction.

While only certain preferred embodiments of this invention have been described, it is understood that many variations can be made without departing from the principles of this invention as defined in the claims which follow.

What is claimed is:
1. Hydraulic transmission comprising:
   a. a stationary housing having a central axis;
   b. cylinder means within said housing for dividing the interior thereof into first and second sides, said means being axially slidable and keyed against rotation;
   c. spaced first and second identical cylindrical rotatable cage means mounted in mirror image of each other for rotation on said cylinder means within said first and second sides, respectively, of the interior of said housing;
   d. first and second rotatable shafts along said central axis for engaging said first and second cage means, respectively, extending out of said housing;
   e. each of said cage means having radial slots communicating with the outer surface of said cylinder means;

f. a radial vane in each of said slots forming a chamber in said slot with the outer surface of said cylinder means;
g. cam means formed in said housing for reciprocating each said radial vane as its cage means rotates thereby varying the depth of its chamber as its cage rotates;
h. an axial vane riding on said cylinder means extending into each slot in each said cage means for defining one end of the chamber in the axial direction formed in said slot; said housing including means to define the other end of said chamber in the axial direction;
i. means for supplying hydraulic fluid to said chambers whereby when said first rotatable shaft is driven by an external source of power said first cage means will rotate and pressurize the hydraulic fluid within chambers whose depths are decreasing;
j. means formed in said housing between said cage means for communicating pressurized chambers within said first cage means with chambers in said second cage means causing rotation of the latter, the second rotatable shaft delivering the output of said transmission; and
k. means to slide said cylinder means axially along with the axial vanes in said slots with respect to said housing thereby to adjust differentially the axial lengths of said chambers within said first and second cage means, respectively, so as to change in an infinitely variable degree the torque and speed ratios of the input and output of said transmission.

2. The transmission of claim 1 in which said cam means includes a pair of radially extending walls in said housing for enclosing a portion of each of said cage means, said walls being provided with camming surfaces, and means included in said radial vanes for engaging said camming surfaces.

3. The transmission of claim 2 in which said cylinder means has a circular central portion whose axis of rotation is said central axis and circular end portions of smaller diameter which have as their axis of rotation an axis parallel to and radially offset from said central axis, said cylinder means haviang shoulders separating the end portions from the central portion, said radial vanes overlapping said shoulders, and each said axial vane riding on an end portion butting against a shoulder and in contact with the radial vane in its slot.

4. The transmission of claim 3 in which said camming surfaces are circular and have as their axis of rotation the aforesaid offset axis.

5. The transmission of claim 4 in which said housing includes means between said cage means for providing communication between chambers in both cage means whose depths are increasing with chambers in the other cage means whose depths are decreasing.

6. The transmission of claim 5 having a sump for hydraulic fluid, means for supplying fluid from said sump to chambers increasing in volume and to receive fluid from chambers decreasing in volume.

7. The transmission of claim 3 in which said camming surfaces are elliptical so that said radial vanes reciprocate twice during a single rotation, and said means formed in said housing between said cage means for communicating hydraulic fluid between chambers in said cage means includes four passageways, each 90 degrees of rotation changing from high pressure to low pressure in sequence thereby providing for radial balancing of hydrodynamic forces.

8. Apparatus for delivering pressurized hydraulic fluid comprising:
a. a stationary housing having a central axis;
b. means supporting a cylinder against rotation within said housing for axially slidable movement;
c. cylindrical rotatable cage means mounted for rotation on said cylinder;
d. a rotatable shaft along said central axis for engaging said cage means extending out of said housing;
e. said cage means having radial slots communicating with the outer surface of said cylinder means;
f. a radial vane in each of said slots forming a chamber in said slog with the outer surface of said cylinder;
g. cam means formed in said housing for reciprocating each said radial vane as its cage means rotates thereby varying the depth of its chamber as its cage means rotates;
h. an axial vane riding on said cylinder means extending into each slot in said cage means for defining one end of the chamber in the axial direction formed in said slot; said housing including means to define the other end of said chamber in the axial direction;
i. means for supplying hydraulic fluid to said chambers whereby when said rotatable shaft is driven by an external source of power said cage means will rotate and pressurize the hydraulic fluid within chambers whose depths are decreasing;
j. cylinder means formed in said housing containing piston means;
k. means found in said housing for communicating pressurized hydraulic fluid in said cage means with said piston means in said cylinder means;
l. means for transferring said hydraulic fluid under pressure out of said cylinder means for use at a remote location; and
m. means interconnecting said piston means within said cylinder for providing an axial balancing force on the latter to oppose the axial force imposed thereon by said axial vanes.

9. Hydraulic transmission comprising:
a. a stationary housing having a central axis;
b. cylinder means within said housing for dividing the interior thereof into first and second sides, said means being axially slidable and rotatable;
c. spaced first and second identical cylindrical rotatable cage means mounted in mirror image of each other for rotation on said cylinder means within said first and second sides, respectively, of the interior of said housing;
d. each of said cage means having radial slots communicating with the outer surface of said cylinder means;
e. a radial vane in each of said slots forming a chamber in said slot with the outer surface of said cylinder means;
f. cam means formed in said housing for reciprocating each said radial vane as its cage means rotates thereby varying the depth of its chamber as its cage rotates;
g. a piston extending from said cylinder means extending into each slot in each said cage means for defining one end of the chamber in the axial direction formed in said slot; said housing including means to define the other end of said chamber in the axial direction;

h. means for supplying hydraulic fluid to said chambers whereby when said first cage means is rotated the hydraulic fluid within chambers whose depths are decreasing is pressurized;

i. means formed in said housing between said cage means for communicating pressurized chambers within said first cage means with chambers in said second cage means causing rotation of the latter; and j. means to slide said cylinder means axially along with said pistons in said slots with respect to said housing thereby to adjust differentially the axial lengths of said chambers within said first and second cage means, respectively, so as to change in an infinitely variable degree the torque and speed ratios of the input and output of said transmission.

* * * * *